United States Patent
Wang et al.

(10) Patent No.: US 12,514,271 B2
(45) Date of Patent: Jan. 6, 2026

(54) PREPARATION METHOD OF KONJAC GRANULE

(71) Applicant: ZHEJIANG LIZIYUAN FOOD CO., LTD., Jinhua (CN)

(72) Inventors: Shunyu Wang, Jinhua (CN); Chengli Fu, Jinhua (CN); Jianxin He, Jinhua (CN); Songyou Zheng, Jinhua (CN); Weijun Wang, Jinhua (CN); Wenxiu Zhu, Jinhua (CN); Zhongjun Su, Jinhua (CN); Guoping Li, Jinhua (CN)

(73) Assignee: ZHEJIANG LIZIYUAN FOOD CO., LTD., Jinhua (CN)

( * ) Notice: Subject to any disclaimer, the term of this patent is extended or adjusted under 35 U.S.C. 154(b) by 391 days.

(21) Appl. No.: 18/022,759

(22) PCT Filed: Aug. 10, 2021

(86) PCT No.: PCT/CN2021/111803
§ 371 (c)(1),
(2) Date: Feb. 23, 2023

(87) PCT Pub. No.: WO2022/042293
PCT Pub. Date: Mar. 3, 2022

(65) Prior Publication Data
US 2023/0309591 A1   Oct. 5, 2023

(30) Foreign Application Priority Data
Aug. 25, 2020 (CN) .......................... 202010862826.4

(51) Int. Cl.
| | | |
|---|---|---|
| *A23L 19/10* | (2016.01) | |
| *A23L 5/30* | (2016.01) | |
| *A23L 29/00* | (2016.01) | |
| *A23L 29/256* | (2016.01) | |
| *A23L 29/294* | (2016.01) | |
| *A23L 33/135* | (2016.01) | |
| *A23P 10/30* | (2016.01) | |

(52) U.S. Cl.
CPC ............... *A23L 19/115* (2016.08); *A23L 5/32* (2016.08); *A23L 29/06* (2016.08); *A23L 29/256* (2016.08); *A23L 29/294* (2016.08); *A23L 33/135* (2016.08); *A23P 10/30* (2016.08); *A23V 2400/169* (2023.08); *A23V 2400/231* (2023.08); *A23V 2400/51* (2023.08)

(58) Field of Classification Search
CPC .......... A23L 19/115; A23L 5/32; A23L 29/06; A23L 29/256; A23L 29/294; A23L 33/135; A23L 19/01; A23P 10/30; A23V 2400/169; A23V 2400/231; A23V 2400/51; Y02A 40/90
USPC ............................................................ 426/52
See application file for complete search history.

(56) References Cited

U.S. PATENT DOCUMENTS 4,971,814 A * 11/1990 Tomita ................... A23L 33/21
426/52

FOREIGN PATENT DOCUMENTS

| CN | 101810320 A | * | 8/2010 | |
|---|---|---|---|---|
| CN | 102258083 A | * | 11/2011 | |
| CN | 102443616 A | * | 5/2012 | |
| CN | 103861538 A | * | 6/2014 | |
| CN | 106072223 A | * | 11/2016 | |
| CN | 107647280 A | * | 2/2018 | ............. A23L 33/21 |
| CN | 107760269 A | * | 3/2018 | ................ C02F 1/40 |
| CN | 107811078 A | * | 3/2018 | |
| CN | 107821738 A | * | 3/2018 | |
| CN | 108522980 A | * | 9/2018 | |
| CN | 109456330 A | * | 3/2019 | ............. C07D 75/04 |
| JP | H11147 A | * | 1/1999 | |

OTHER PUBLICATIONS

NPL Konjac pasteurization (Retrieved on May 13, 2025). (Year: 2025).*

* cited by examiner

*Primary Examiner* — Erik Kashnikow
*Assistant Examiner* — Bhaskar Mukhopadhyay
(74) *Attorney, Agent, or Firm* — Bayramoglu Law Offices LLC

(57) ABSTRACT

A preparation method of a konjac granule includes the following steps: step 1: dissolving a konjac powder in hot water; step 2: subjecting a mixed solution obtained in step 1 to sterilization; step 3: conducting enzymatic hydrolysis at 50° C. to 70° C. for 2 h to 6 h; step 4: conducting enzymatic inactivation; step 5: conducting homogenization at 10 Mpa to 45 Mpa; step 6: adding a fully-dissolved sodium alginate solution and a flavor-modulating substance to a mixed solution obtained in step 5, and thoroughly mixing; and step 7: calcification and gelation: adding a calcium solution to a mixed solution obtained in step 6 for gelation to obtain the konjac granule. The preparation method improves the compactness of the konjac granule, increases a gel strength, and is conducive to extending a shelf life of a product.

13 Claims, No Drawings

PREPARATION METHOD OF KONJAC GRANULE

CROSS REFERENCE TO THE RELATED APPLICATIONS

This application is the national phase entry of International Application No. PCT/CN2021/111803, filed on Aug. 10, 2021, which is based upon and claims priority to Chinese Patent Application No. 202010862826.4, filed on Aug. 25, 2020, the entire contents of which are incorporated herein by reference.

TECHNICAL FIELD

The present disclosure relates to the technical field of food production, and in particular, to a preparation method of a konjac granule.

BACKGROUND

Konjac is also called Amorphophallus konjac, Voodoo Lily, or the like. In recent years, konjac foods have been popular all over the world due to their peculiar health and medical effects and have been called "magic foods" and "health foods". A main component of konjac is konjac glucomannan (KGM), and konjac also includes 16 amino acids, a variety of minerals, vitamin A, vitamin B, etc. As a high-molecular compound, KGM is a water-soluble dietary fiber, which is the seventh nutrient in the human body. KGM is an intestinal scavenger that can prevent the excessive absorption of sugar, lipid, and cholesterol in the human body, exhibit a special effect for the prevention and treatment of diabetes and hypertension, prevent and treat colon cancer, breast cancer, and obesity, and have an effect of detoxification and beauty.

Biomimetic foods are an emerging variety in the food industry, which imitate natural foods in terms of nutrition, flavor, or shape, have a unique flavor, and are convenient to eat. Biomimetic foods are favored by consumers. Popping boba with a crisp taste, obvious juice bursting, delicate texture, bright color, and elasticity is developed as a biomimetic food. A konjac powder recombination-forming technique is mainly used to encapsulate various fruit granules, such as grape granules, peach granules, and mango granules and/or fruit juice in konjac to obtain biomimetic fruit granules, and such biomimetic fruit granules achieve the perfect combination of a konjac powder and/or a konjac enzymatic hydrolysate with a fruit granule or a fruit juice, such that a beneficial effect of konjac is maximized. Popping boba greatly extends the chewing sensation and shelf life of fruit granules, leads to a bursting sensation, and improves the eating fun of consumers. Thus, popping boba is a healthy, nutritious, delicious, and fun functional product, can be added to beverages, jellies, shaved ices, jams, and other products, and has a promising market prospect.

KGM has characteristics such as high expansion, water retention, viscoelasticity, and easy gelation and pore-forming, and biomimetic products prepared with KGM have both excellent taste and thorough flavoring. In the current preparation process of popping boba, 50% of a konjac powder is first subjected to enzymatic hydrolysis and then added to a konjac biomimetic fruit granule. Currently, popping boba is mainly prepared by using raw and adjuvant materials such as konjac powder, sodium alginate, potassium chloride, flavor substances (such as milk powder and cocoa powder), and a prebiotic (such as an oligosaccharide, a polysaccharide, a polyol, and a protein hydrolysate) in combination. The problem that konjac biomimetic fruit granules are easy to break has been solved through long-term tests, and a retention time of a mixed solution in a calcium preparation can be controlled to control the elasticity of biomimetic fruit granules. When added to a beverage, the biomimetic fruit granule provides the beverage with a plump taste and allows consumers to have a refreshing feeling. This new food incorporates many modern fast-paced and fashionable elements and is more likely to meet the nutritional and psychological needs of modern people.

In the prior art, konjac is mostly mixed with sodium alginate and a soluble calcium source to prepare a calcium alginate colloid encapsulated by konjac. Sodium alginate is a polysaccharide extracted from Laminaria japonica or Sargassum of the Phaeophyta and is a linear polymer composed of β-D-mannuronic acid and α-L-guluronic acid with a molecular formula of $[C_6H_7O_6Na_2]_n$ and a relative molecular weight of 32,000 to 200,000. Sodium alginate can undergo a displacement reaction with a multivalent metal ion such as $Ca^{2+}$, $Ba^{2+}$, and $Al^{3+}$ to produce an irreversible gel.

A main component of konjac is KGM with a molecular formula of $[C_6H_{10}O_5]_n$, which is a heteropolysaccharide obtained by linking D-glucose and D-mannose in a concentration ratio of 1:1.6 through β-1,4 glycosidic bonds. Konjac gum produced through the hydrolysis of konjac is a non-gel polysaccharide.

Dispersions of a calcium alginate gel and a konjac gel can only be stored in a fruit juice or a beverage for a limited time, which severely limits a shelf life of a commodity.

SUMMARY

An objective of the present disclosure is to provide a preparation method of a konjac granule. The present disclosure effectively improves the compactness of the konjac granule, increases a gel strength, and is conducive to extending a shelf life of a product.

To solve this technical problem, the present disclosure adopts the following technical solutions: A preparation method of a konjac granule is provided, including the following steps:
  step 1: dissolving a konjac powder in hot water;
  step 2: subjecting a mixed solution obtained in step 1 to sterilization;
  step 3: conducting enzymatic hydrolysis at 50° C. to 70° C. for 2 h to 6 h;
  step 4: conducting enzymatic inactivation;
  step 5: conducting homogenization at 10 Mpa to 45 Mpa;
  step 6: adding a fully-dissolved sodium alginate solution and a flavor-modulating substance to a mixed solution obtained in step 5, and thoroughly mixing; and
  step 7: calcification and gelation:
  adding a calcium solution to a mixed solution obtained in step 6 for gelation to obtain the konjac granule.

Preferably, in step 1, the hot water for dissolving the konjac powder has a temperature of 60° C. to 80° C., and a mass of the hot water is 80 to 200 times a mass of the konjac powder, which is conducive to the thorough dissolution and enzymatic hydrolysis of the konjac powder.

Preferably, in step 1, after the konjac powder is dissolved in the hot water, a resulting mixture is subjected to an ultrasonic treatment under the following conditions:
  ultrasonic working/interval time: 2 s/2 s to 6 s/6 s;
  ultrasonic power: 300 W to 600 W;

temperature control: 40° C. to 80° C.; and
ultrasonic time: 45 min to 90 min.

The present disclosure controls the ultrasonic treatment to make the konjac powder dissolved and dispersed uniformly, which is conducive to reducing the voids in granules and improving the gel strength of granules.

Preferably, in step 2, the sterilization is conducted at 85° C. to 121° C. for 5 s to 20 min; and
a sterilized mixed solution is cooled to 55° C. to 75° C.

The present disclosure ensures thorough sterilization to ensure the safety and stability of the product, such that the product meets the national standards.

Preferably, in step 3, an enzyme is added at an amount of 10 to 100*10³ U/g; and
the enzyme is one or more selected from the group consisting of cellulase, α-amylase, β-glucanase, and β-mannanase. In the present disclosure, a long chain of KGM is broken through enzymatic hydrolysis, such that the influence of the long chain sugar of konjac on an internal structure of a colloid is weakened while retaining the components of konjac beneficial to the human body, which reduces the voids existing due to the structure of konjac, strengthens the uniformity of a calcium alginate colloid, and improves the uniformity and compactness of an internal structure of granules.

Preferably, in step 4, the enzymatic inactivation is conducted at 80° C. to 100° C. for 5 min to 10 min; and
a mixed solution obtained after the enzymatic inactivation is cooled to 10° C. to 30° C.

Preferably, in step 4, after the enzymatic inactivation is completed, a probiotic is added to a resulting mixed solution, and fermentation is conducted at 35° C. to 50° C. for 5 h to 48 h; and
after the fermentation is completed, the temperature is decreased to 10° C. to 30° C. to obtain a konjac fermentation broth. In the present disclosure, a mixed system obtained after the enzymatic hydrolysis is subjected to fermentation with the probiotic, and the fermentation uniformly refines the dispersion of the konjac powder in water, such that the konjac powder can be uniformly dispersed in sodium alginate without affecting a structure of a colloid. In addition, the fermentation also enriches a flavor of the product, which is conducive to the cooperation of the product with a variety of flavor-modulating substances.

Preferably, the probiotic is added at an amount of 2 to 100*10³ U/g; and
the probiotic is one or more selected from the group consisting of *Lactobacillus plantarum*, *Streptococcus lactis*, and *Bifidobacterium*. Preferably, the calcium solution is a solution of one or more selected from the group consisting of calcium chloride, calcium lactate, calcium gluconate, and calcium citrate. The calcium agent reacts with sodium alginate to produce a calcium alginate colloid, and the calcium solution is conducive to the uniform and rapid dispersion of calcium ions and sodium alginate in the solution; and the calcium alginate colloid evenly encapsulates small molecule products of enzymatic hydrolysis and fermentation of konjac dispersed in the system, and then forming is conducted to obtain the konjac granule with an excellent gel strength.

With the above technical solutions, the present disclosure achieves the following beneficial effects:
1. The gel prepared with a konjac powder, sodium alginate, and a calcium solution in the prior art, such as pearls in bubble tea, swells after being soaked in a fruit juice, a dairy product, or a bean product for a period of time, which is not conducive to a shelf life of a product and can hardly retain the Q-bomb taste.

In the present disclosure, the dissolved konjac powder is first subjected to enzymatic hydrolysis, such that the long-chain molecular structure in the konjac powder is decomposed while retaining the nutrition of the konjac powder, which retains the internal structure of the calcium alginate colloid, reduces the influence of konjac on the internal structure of calcium alginate, and reduces the loosening of the long-chain KGM for the calcium alginate internal colloid in the gel; and the hydrolyzed konjac cooperates with the calcium alginate colloid to enhance the gel strength and improve the anti-swelling performance and stretchable length of the konjac granule, such that the konjac granule can be used in combination with a fruit juice or a dairy product while retaining an ideal Q-bomb taste.

2. The preparation method of the present disclosure can lead to a safe granule with an ideal taste through a simple process, which does not require the use of excessive food additives.

Thus, the objective of the present disclosure is achieved.

DETAILED DESCRIPTION OF THE EMBODIMENTS

The technical solutions of the present disclosure are described in further detail below with reference to specific examples.

Example 1

A preparation method of a konjac granule was provided, including the following steps:

Step 1: A konjac powder was dissolved in hot water.

The hot water had a temperature of 60° C., and a mass of the hot water was 80 times a mass of the konjac powder, which was conducive to the thorough dissolution and enzymatic hydrolysis of the konjac powder.

In step 1, after the konjac powder was dissolved in the hot water, a resulting mixture was subjected to an ultrasonic treatment under the following conditions:
ultrasonic working/interval time: 2 s/2 s;
ultrasonic power: 300 W;
temperature control: 40° C.; and
ultrasonic time: 45 min.

Step 2: A mixed solution obtained in step 1 was subjected to sterilization.

The sterilization was conducted at 85° C. for 20 min; and a sterilized mixed solution was cooled to 55° C.

Step 3: Enzymatic hydrolysis was conducted at 50° C. for 6 h.

An enzyme used was cellulase, which was added at an amount of 10*10³ U/g.

Step 4: Enzymatic inactivation was conducted at 80° C. for 10 min.

A mixed solution obtained after the enzymatic inactivation was cooled to 10° C.

Step 5: Homogenization was conducted at 10 Mpa to 45 Mpa.

Step 6: A fully-dissolved sodium alginate solution and a flavor-modulating substance were added to a mixed solution obtained in step 5, and a resulting mixture was thoroughly mixed. The flavor-modulating substance may be selected from the group consisting of milk powder, cocoa powder, white sugar, a fruit juice, and a prebiotic. The milk powder was used in this example.

Step 7: Calcification and gelation:
A calcium chloride solution was added to a mixed solution obtained in step 6 for gelation to obtain the konjac granule.

Example 2

A preparation method of a konjac granule was provided, including the following steps:

Step 1: A konjac powder was dissolved in hot water.

The hot water had a temperature of 65° C., and a mass of the hot water was 160 times a mass of the konjac powder, which was conducive to the thorough dissolution and enzymatic hydrolysis of the konjac powder.

In step 1, after the konjac powder was dissolved in the hot water, a resulting mixture was subjected to an ultrasonic treatment under the following conditions:
ultrasonic working/interval time: 3 s/3 s;
ultrasonic power: 400 W;
temperature control: 50° C.; and
ultrasonic time: 55 min.

Step 2: A mixed solution obtained in step 1 was subjected to sterilization.

The sterilization was conducted at 100° C. for 10 min; and a sterilized mixed solution was cooled to 60° C.

Step 3: Enzymatic hydrolysis was conducted at 60° C. for 4 h.

An enzyme used was α-amylase, which was added at an amount of $30*10^3$ U/g.

Step 4: Enzymatic inactivation was conducted at 90° C. for 10 min.

A mixed solution obtained after the enzymatic inactivation was cooled to 20° C.

In step 4, after the enzymatic inactivation was completed, a probiotic was added to a resulting mixed solution, and fermentation was conducted at 35° C. for 5 h; and after the fermentation was completed, the temperature was decreased 10° C. to obtain a konjac fermentation broth.

The probiotic was *L. plantarum*, which was added at an amount of $2*10^3$ U/g.

Step 5: Homogenization was conducted at 10 Mpa to 45 Mpa.

Step 6: A fully-dissolved sodium alginate solution and a flavor-modulating substance were added to a mixed solution obtained in step 5, and a resulting mixture was thoroughly mixed. The flavor-modulating substance may be selected from the group consisting of milk powder, cocoa powder, white sugar, a fruit juice, and a prebiotic. The milk powder was used in this example.

Step 7: Calcification and gelation:
A calcium chloride solution was added to a mixed solution obtained in step 6 for gelation to obtain the konjac granule.

Example 3

A preparation method of a konjac granule was provided, including the following steps:

Step 1: A konjac powder was dissolved in hot water.

The hot water had a temperature of 70° C., and a mass of the hot water was 120 times a mass of the konjac powder, which was conducive to the thorough dissolution and enzymatic hydrolysis of the konjac powder.

In step 1, after the konjac powder was dissolved in the hot water, a resulting mixture was subjected to an ultrasonic treatment under the following conditions:
ultrasonic working/interval time: 4 s/4 s;
ultrasonic power: 500 W;
temperature control: 60° C.; and
ultrasonic time: 65 min.

Step 2: A mixed solution obtained in step 1 was subjected to sterilization.

The sterilization was conducted at 121° C. for 5 s; and a sterilized mixed solution was cooled to 65° C.

Step 3: Enzymatic hydrolysis was conducted at 70° C. for 4 h.

An enzyme used was β-glucanase, which was added at an amount of $60*10^3$ U/g.

Step 4: Enzymatic inactivation was conducted at 100° C. for 5 min.

A mixed solution obtained after the enzymatic inactivation was cooled to 30° C.

In step 4, after the enzymatic inactivation was completed, a probiotic was added to a resulting mixed solution, and fermentation was conducted at 40° C. for 24 h; and after the fermentation was completed, the temperature was decreased 20° C. to obtain a konjac fermentation broth.

The probiotic was *S. lactis*, which was added at an amount of $50*10^3$ U/g.

Step 5: Homogenization was conducted at 10 Mpa to 45 Mpa.

Step 6: A fully-dissolved sodium alginate solution and a flavor-modulating substance were added to a mixed solution obtained in step 5, and a resulting mixture was thoroughly mixed. The flavor-modulating substance may be selected from the group consisting of milk powder, cocoa powder, white sugar, a fruit juice, and a prebiotic. The milk powder was used in this example.

Step 7: Calcification and gelation:
A calcium citrate solution was added to a mixed solution obtained in step 6 for gelation to obtain the konjac granule.

Example 4

A preparation method of a konjac granule was provided, including the following steps:

Step 1: A konjac powder was dissolved in hot water.

The hot water had a temperature of 75° C., and a mass of the hot water was 160 times a mass of the konjac powder, which was conducive to the thorough dissolution and enzymatic hydrolysis of the konjac powder.

In step 1, after the konjac powder was dissolved in the hot water, a resulting mixture was subjected to an ultrasonic treatment under the following conditions:
ultrasonic working/interval time: 5 s/5 s;
ultrasonic power: 600 W;
temperature control: 70° C.; and
ultrasonic time: 75 min.

Step 2: A mixed solution obtained in step 1 was subjected to sterilization.

The sterilization was conducted at 110° C. for 5 min; and a sterilized mixed solution was cooled to 70° C.

Step 3: Enzymatic hydrolysis was conducted at 60° C. for 5 h.

An enzyme used was β-mannanase, which was added at an amount of $100*10^3$ U/g.

Step 4: Enzymatic inactivation was conducted at 90° C. for 10 min.

A mixed solution obtained after the enzymatic inactivation was cooled to 20° C.

In step 4, after the enzymatic inactivation was completed, a probiotic was added to a resulting mixed solution, and fermentation was conducted at 50° C. for 48 h; and after the fermentation was completed, the temperature was decreased 30° C. to obtain a konjac fermentation broth.

The probiotic was *Bifidobacterium*, which was added at an amount of 100*10³ U/g.

Step 5: Homogenization was conducted at 10 Mpa to 45 Mpa.

Step 6: A fully-dissolved sodium alginate solution and a flavor-modulating substance were added to a mixed solution obtained in step 5, and a resulting mixture was thoroughly mixed. The flavor-modulating substance may be selected from the group consisting of milk powder, cocoa powder, white sugar, a fruit juice, and a prebiotic. The milk powder was used in this example.

Step 7: Calcification and gelation:

A calcium gluconate solution was added to a mixed solution obtained in step 6 for gelation to obtain the konjac granule.

Example 5

A preparation method of a konjac granule was provided, including the following steps:

Step 1: A konjac powder was dissolved in hot water.

The hot water had a temperature of 80° C., and a mass of the hot water was 200 times a mass of the konjac powder, which was conducive to the thorough dissolution and enzymatic hydrolysis of the konjac powder.

In step 1, after the konjac powder was dissolved in the hot water, a resulting mixture was subjected to an ultrasonic treatment under the following conditions:

ultrasonic working/interval time: 6 s/6 s;
ultrasonic power: 500 W;
temperature control: 80° C.; and
ultrasonic time: 90 min.

Step 2: A mixed solution obtained in step 1 was subjected to sterilization.

The sterilization was conducted at 121° C. for 30 s; and a sterilized mixed solution was cooled to 75° C.

Step 3: Enzymatic hydrolysis was conducted at 50° C. for 6 h.

An enzyme used was α-amylase, which was added at an amount of 80*10³ U/g.

Step 4: Enzymatic inactivation was conducted at 80° C. for 5 min.

A mixed solution obtained after the enzymatic inactivation was cooled to 10° C.

Step 5: Homogenization was conducted at 10 Mpa to 45 Mpa.

Step 6: A fully-dissolved sodium alginate solution and a flavor-modulating substance were added to a mixed solution obtained in step 5, and a resulting mixture was thoroughly mixed. The flavor-modulating substance may be selected from the group consisting of milk powder, cocoa powder, white sugar, a fruit juice, and a prebiotic. The milk powder was used in this example.

Step 7: Calcification and gelation:

A calcium lactate solution was added to a mixed solution obtained in step 6 for gelation to obtain the konjac granule.

Preferably, the calcium solution is a solution of one or more selected from the group consisting of calcium chloride, calcium lactate, calcium gluconate, and calcium citrate. The calcium agent reacts with sodium alginate to produce a calcium alginate colloid, and the calcium solution is conducive to the uniform and rapid dispersion of calcium ions and sodium alginate in the solution; and the calcium alginate colloid evenly encapsulates small molecule products of enzymatic hydrolysis and fermentation of konjac dispersed in the system, and then forming is conducted to obtain the konjac granule with an excellent gel strength.

Comparative Example 1

A konjac granule was prepared by mixing a konjac powder, sodium alginate, and calcium chloride at the same amounts as in Example 1.

Comparative Example 2

A gel granule was prepared by mixing sodium alginate and calcium chloride at the same amounts as in Example 1.

The granules prepared in Examples 1 to 5 and Comparative Examples 1 and 2 each were subjected to a swelling performance test and a tensile strength test, and detailed test results were shown in Table 1. Specific test methods were as follows:

Swelling Performance Test

A specified amount of a granule with the surface moisture removed was socked in pure water refrigerated at 4° C., and then placed for 1 d/7 d/14 d/28 d; the granule that had been placed for different periods of time was taken out, a state was observed, and a weight was measured; and the surface moisture was removed, and a swelling rate of the granule was calculated as follows:

swelling rate=(mass after soaking−mass before soaking)/mass before soaking.

Tensile Strength Test

A gel was prepared into a 5 cm×0.2 cm strip and a 1.5 cm×2.0 cm column, and the tensile strength and elongation at break were determined on a universal electron tensile testing machine. 5 replicates were prepared for each sample, and an average was taken as an experimental value. A beam speed was 5 mm min-1, and the room temperature was kept at 25° C.

TABLE 1

Test data of the granules prepared in the examples and comparative examples

| Item | Swelling performance | | | | Tensile strength at break | Elongation at break |
| --- | --- | --- | --- | --- | --- | --- |
| | 1 d | 7 d | 14 d | 28 d | | |
| Example 1 | 0.8% | 3.1% | 2.8% | 3.9% | 38 kpa | 40.6% |
| Example 2 | 0.8% | 2.6% | 2.7% | 2.8% | 40 kpa | 38.9% |
| Example 3 | 0.8% | 1.8% | 1.9% | 2.1% | 37 kpa | 37.5% |
| Example 4 | 0.7% | 1.5% | 1.9% | 2.3% | 36 kpa | 39.1% |
| Example 5 | 1.0% | 1.9% | 2.6% | 3.8% | 41 kpa | 36.5% |
| Comparative Example 1 | 20.3% | / | / | / | 37 kpa | 42.8% |
| Comparative Example 2 | 0.8% | 1.1% | 1.6% | 2.3% | 42 kpa | 35.6% |

It can be seen from the changes of the process and raw materials in Examples 1 to 5 compared with the comparative examples that the konjac granule prepared by the present disclosure well retains the gel strength; compared with Comparative Example 1, the swelling performance of the granule is effectively improved, that is, the granule prepared by the present disclosure can be placed in water or fruit juices and dairy products for a long period of time, which is conducive to the extension of a shelf life of a product; and the konjac granule prepared by the present disclosure has a similar gel strength to the gel prepared in Comparative Example 2 while retaining the Q-bomb taste.

What is claimed is:

1. A preparation method of a konjac granule, comprising the following steps:
step 1: dissolving a konjac powder in hot water;
step 2: subjecting a mixed solution obtained in step 1 to sterilization;
step 3: conducting enzymatic hydrolysis at 50° C. to 70° C. for 2 h to 6 h;
step 4: conducting enzymatic inactivation;
step 5: conducting homogenization at 10 Mpa to 45 Mpa;
step 6: adding a fully-dissolved sodium alginate solution and a flavor-modulating substance to a mixed solution obtained in step 5, and thoroughly mixing; and
step 7: calcification and gelation:
adding a calcium solution to a mixed solution obtained in step 6 for gelation to obtain the konjac granule;
wherein a calcium agent reacts with a sodium alginate to produce a calcium alginate colloid, and the calcium alginate colloid evenly encapsulates small molecule products of enzymatic hydrolysis and fermented konjac dispersed in a system, and then forming is conducted to obtain the konjac granule,
wherein in step 4, after the enzymatic inactivation is completed, a probiotic is added to a resulting mixed solution, and fermentation is conducted at 35° C. for 5 h; and
after the fermentation is completed, the temperature is decreased to 10° C. to obtain a konjac fermentation broth.

2. The preparation method of the konjac granule according to claim 1, wherein in step 1, the hot water for dissolving the konjac powder has a temperature of 60° C. to 80° C., and a mass of the hot water is 80 to 200 times a mass of the konjac powder.

3. The preparation method of the konjac granule according to claim 1, wherein in step 1, after the konjac powder is dissolved in the hot water, a resulting mixture is subjected to an ultrasonic treatment under the following conditions:
ultrasonic working/interval time: 2 s/2 s to 6 s/6 s;
ultrasonic power: 300 W to 600 W;
temperature control: 40° C. to 80° C.; and
ultrasonic time: 45 min to 90 min.

4. The preparation method of the konjac granule according to claim 1, wherein in step 2, the sterilization is conducted at 85° C. to 121° C. for 5 s to 20 min; and
a sterilized mixed solution is cooled to 55° C. to 75° C.

5. The preparation method of the konjac granule according to claim 1, wherein in step 3, an enzyme is added at an amount of 10 to $100*10^3$ U/g; and
the enzyme is one or more selected from the group consisting of cellulase, α-amylase, β-glucanase, and β-mannanase.

6. The preparation method of the konjac granule according to claim 1, wherein in step 4, the enzymatic inactivation is conducted at 80° C. to 100° C. for 5 min to 10 min; and
a mixed solution obtained after the enzymatic inactivation is cooled to 10° C.

7. The preparation method of the konjac granule according to claim 1, wherein the probiotic is added at an amount of 2 to $100*10^3$ U/g; and the probiotic is one or more selected from the group consisting of *Lactobacillus plantarum, Streptococcus lactis*, and *Bifidobacterium*.

8. The preparation method of the konjac granule according to claim 1, wherein the calcium solution is a solution of one or more selected from the group consisting of calcium chloride, calcium lactate, calcium gluconate, and calcium citrate.

9. The preparation method of the konjac granule according to claim 1, comprising the following steps:
in step 1 the hot water for dissolving the konjac powder has a temperature of 60° C., and a mass of the hot water is 80 times a mass of the konjac powder;
in step 1, after the konjac powder is dissolved in the hot water, a resulting mixture is subjected to an ultrasonic treatment under the following conditions:
ultrasonic working/interval time: 2 s/2 s
ultrasonic power: 300 W;
temperature control: 40° C.; and
ultrasonic time: 45 min;
in step 2, the sterilization is conducted at 85° C. for 20 min; and
a sterilized mixed solution is cooled to 55° C.;
in step 3, an enzyme is added at an amount of $10*10^3$ U/g; and
the enzyme is cellulase;
in step 4, the enzymatic inactivation is conducted at 80° C. for 10 min; and
a mixed solution obtained after the enzymatic inactivation is cooled to 10° C.; and
in step 6 the flavor-modulating substance is milk powder.

10. The preparation method of the konjac granule according to claim 1, comprising the following steps:
in step 1
the hot water for dissolving the konjac powder has a temperature of 65° C., and a mass of the hot water is 160 times a mass of the konjac powder;
in step 1, after the konjac powder is dissolved in the hot water, a resulting mixture is subjected to an ultrasonic treatment under the following conditions:
ultrasonic working/interval time: 3 s/3 s;
ultrasonic power: 400 W;
temperature control: 50° C.; and
ultrasonic time: 55 min;
in step 2, the sterilization is conducted at 100° C. for 10 min; and
a sterilized mixed solution is cooled to 60° C.;
step 3: conducting enzymatic hydrolysis at 60° C. for 4 h;
in step 3, an enzyme is added at an amount of $30*10^3$ U/g; and
the enzyme is 60 -amylase; and
step 4: conducting enzymatic inactivation;
in step 4, the enzymatic inactivation is conducted at 90° C. for 10 min;
a mixed solution obtained after the enzymatic inactivation is cooled to 20° C.;
the probiotic is added at an amount of $2*10^3$ U/g; and
the probiotic is *Lactobacillus plantarum*.

11. The preparation method of the konjac granule according to claim 1, comprising the following steps:
in step 1
the hot water for dissolving the konjac powder has a temperature of 70° C., and a mass of the hot water is 120 times a mass of the konjac powder;
in step 1, after the konjac powder is dissolved in the hot water, a resulting mixture is subjected to an ultrasonic treatment under the following conditions:
ultrasonic working/interval time: 4 s/4 s;
ultrasonic power: 500 W;
temperature control: 60° C.; and
ultrasonic time: 65 min;
in step 2, the sterilization is conducted at 121° C. for 5 s; and
a sterilized mixed solution is cooled to 65° C.;

step 3: conducting enzymatic hydrolysis at 70° C. for 4 h;
in step 3, an enzyme is added at an amount of 60*10³ U/g; and
the enzyme is β-glucanas;
in step 4, the enzymatic inactivation is conducted at 100° C. for 5 min;
a mixed solution obtained after the enzymatic inactivation is cooled to 30° C.;
the probiotic is added at an amount of 50*10³ U/g; and
the probiotic is *Streptococcus lactis;*
the flavor-modulating substance is milk powder.

12. The preparation method of the konjac granule according to claim 1, comprising the following steps:
step 1: dissolving the konjac powder in hot water;
the hot water for dissolving the konjac powder has a temperature of 75° C., and a mass of the hot water is 160 times a mass of the konjac powder;
in step 1, after the konjac powder is dissolved in the hot water, a resulting mixture is subjected to an ultrasonic treatment under the following conditions:
ultrasonic working/interval time: 5 s/5 s;
ultrasonic power: 600 W;
temperature control: 70° C.; and
ultrasonic time: 75 min;
step 2: subjecting the mixed solution obtained in step 1 to sterilization;
in step 2, the sterilization is conducted at 110° C. for 5 min; and
a sterilized mixed solution is cooled to 70° C.;
step 3: conducting enzymatic hydrolysis at 60° C. for 5 h;
in step 3, an enzyme is added at an amount of 100*10³ U/g; and
the enzyme is β-mannanase;
step 4: conducting enzymatic inactivation;
in step 4, the enzymatic inactivation is conducted at 90° C. for 10 min;
a mixed solution obtained after the enzymatic inactivation is cooled to 20° C.;
after the enzymatic inactivation is completed, a probiotic is added to a resulting mixed solution, and fermentation is conducted at 50° C. for 48 h;
after the fermentation is completed, the temperature is decreased to 30° C. to obtain a konjac fermentation broth;
the probiotic is added at an amount of 100*10³ U/g; and
the probiotic is *Bifidobacterium;*
step 5: conducting homogenization at 10 Mpa to 45 Mpa;
step 6: adding the fully-dissolved sodium alginate solution and the flavor-modulating substance to the mixed solution obtained in step 5, and thoroughly mixing;
the flavor-modulating substance is milk powder; and
step 7: calcification and gelation:
adding a calcium gluconate solution to the mixed solution obtained in step 6 for gelation to obtain the konjac granule.

13. The preparation method of the konjac granule according to claim 1, comprising the following steps:
step 1: dissolving the konjac powder in hot water;
the hot water for dissolving the konjac powder has a temperature of 80° C., and a mass of the hot water is 200 times a mass of the konjac powder;
in step 1, after the konjac powder is dissolved in the hot water, a resulting mixture is subjected to an ultrasonic treatment under the following conditions:
ultrasonic working/interval time: 6 s/6 s;
ultrasonic power: 500 W;
temperature control: 80° C.; and
ultrasonic time: 90 min;
step 2: subjecting the mixed solution obtained in step 1 to sterilization;
in step 2, the sterilization is conducted at 121° C. for 30 s; and
a sterilized mixed solution is cooled to 75° C.;
step 3: conducting enzymatic hydrolysis at 50° C. for 6 h;
in step 3, an enzyme is added at an amount of 80*10³ U/g; and
the enzyme is α-amylase;
step 4: conducting enzymatic inactivation;
in step 4, the enzymatic inactivation is conducted at 80° C. for 5 min; and
a mixed solution obtained after the enzymatic inactivation is cooled to 10° C.;
step 5: conducting homogenization at 10 Mpa to 45 Mpa;
step 6: adding the fully-dissolved sodium alginate solution and the flavor-modulating substance to the mixed solution obtained in step 5, and thoroughly mixing;
the flavor-modulating substance is milk powder; and
step 7: calcification and gelation:
adding a calcium lactate solution to the mixed solution obtained in step 6 for gelation to obtain the konjac granule.

* * * * *